No. 620,401. Patented Feb. 28, 1899.
B. ALMONTE.
MIRROR HOLDER.
(Application filed June 8, 1898.)
(No Model.)

Witnesses:
Oscar F. Hill
Robert Wallace.

Inventor:
Bernard Almonte
by H. A. Copeland
Attorney

THE NORRIS PETERS CO., PHOTO-LITHO., WASHINGTON, D. C.

UNITED STATES PATENT OFFICE.

BERNARD ALMONTE, OF BOSTON, MASSACHUSETTS.

MIRROR-HOLDER.

SPECIFICATION forming part of Letters Patent No. 620,401, dated February 28, 1899.

Application filed June 8, 1898. Serial No. 682,863. (No model.)

*To all whom it may concern:*

Be it known that I, BERNARD ALMONTE, a citizen of the United States, and a resident of Boston, in the county of Suffolk and State of Massachusetts, have invented certain new and useful Improvements in Mirror-Holders, of which the following, taken in connection with the accompanying drawings, is a specification.

My invention relates especially to a holder for a mirror to be attached to the backs of chairs in halls, theaters, and other public places for the use of the person sitting behind it; and the object of my invention is to produce a holder which is simple in construction and allows the mirror to be readily adjusted at different angles.

The invention consists in a mirror-holder having the novel features of construction which will be described, and particularly pointed out in the claim at the end of the specification.

Figure 1:
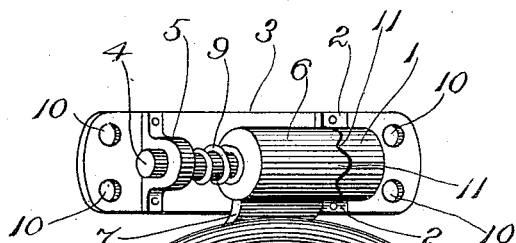
Figure 2:
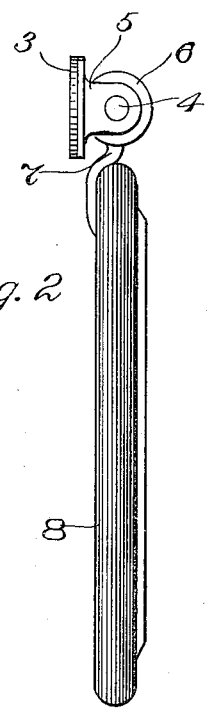
Figure 3:
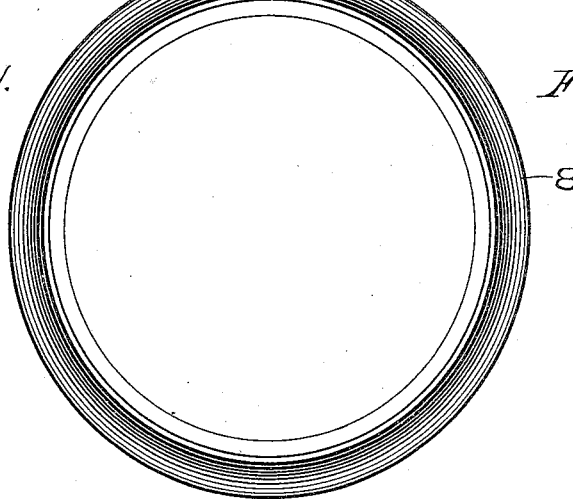
Figure 3:
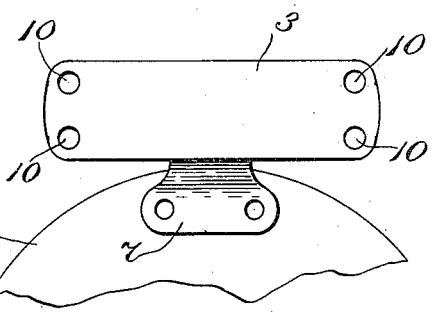
Figure 4:
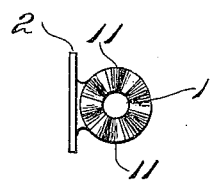
Figure 5:
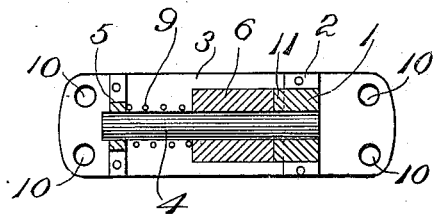

In the drawings, Figure 1 is a perspective view of a mirror-holder embodying my invention and having a mirror attached thereto. Fig. 2 is an end view. Fig. 3 is a back view. Fig. 4 is an end view of the corrugated end of the fixed member of the clutch. Fig. 5 is a longitudinal section through the clutch.

The holder consists, essentially, of a clutch having a fixed member attached to a wall-plate and a partially-rotatable member, to which is secured the mirror. The fixed member 1 of the clutch has flanges 2, which are riveted or otherwise secured to the wall-plate 3. An arbor 4, projecting from the end of said fixed member, is supported at its other end in a bracket-bearing 5, attached to the plate 3. The rotatable member 6 is loosely mounted on said arbor 4 and has a plate 7, to which the mirror 8 is secured. The fixed member 1 and the rotatable member 6 have complementary corrugations 11 at their inner ends, so that the projecting portions of each will fit in the corresponding notches of the other. A spring 9, pressing against the outer end of the rotatable member 6, holds the two members of the clutch normally in engagement. The corrugated teeth being rounded off, however, the mirror may be moved by the hand like a crank to overcome the tension of the spring 9, which yields and permits a slight axial movement of the rotatable member, so that its teeth may ride over the teeth of the fixed member 1 and permit the mirror to be adjusted at the angle desired. Each time a tooth is passed the spring will throw the movable member back into engagement. The arbor 4 may be made fast to the rotatable member and turn in the fixed member 1 and bracket 5, and this would come within the scope of my invention; but I prefer to make the arbor fixed and the rotatable member loose on the arbor. The plate 3 is formed with screw-holes 10, so that it may be secured to the back of the chair in front of the user, or it may be secured in any suitable way.

While I have specially intended my mirror-holder for use in theaters and halls, it is adapted for use in other places, such as state-rooms on board ship, &c.

What I claim as my invention is—

In combination with a mirror and its frame, a plate secured to said frame and having an arm which projects radially outward, a barrel on the outer end of said arm extending in a tangential direction to the mirror-frame, one end of said barrel being corrugated, a holder-plate lying in a plane parallel with the mirror-frame and attachable to a chair-back or wall, a cylindrical clutch member having a flanged piece on one side which is secured to said holder-plate, said clutch member having corrugations on one end which engage with complementary corrugations on the end of said barrel, said clutch member also having an arbor projecting therefrom on which said barrel is mounted, and which extends beyond the opposite end of said barrel, a bracket projecting from said holder-plate and supporting the outer end of said arbor, and a tension-spring which normally holds the barrel and the clutch member locked together, the mirror being adjustable to varying angles radially with said arbor by pressure on the mirror merely in the direction of rotation, and automatically locking, substantially as described.

In testimony whereof I affix my signature in presence of two witnesses.

BERNARD ALMONTE.

Witnesses:
WILLIAM A. COPELAND,
OSCAR F. HILL.